United States Patent [19]
Mueller et al.

[11] Patent Number: 6,043,734
[45] Date of Patent: Mar. 28, 2000

[54] OPTICAL SHOCK SENSOR

[75] Inventors: Rand W. Mueller, Bloomfield Hills; Peter J. Stouffer, Clarkston; Jon Richard Gillespie, Commerce; Joseph A. Santavicca, Eastpointe; Matthew J. McAmmond, Auburn Hills, all of Mich.

[73] Assignee: Code Alarm, Inc., Madison Heights, Mich.

[21] Appl. No.: 09/172,446

[22] Filed: Oct. 14, 1998

[51] Int. Cl.[7] ............................. B60R 25/10; G08B 13/18
[52] U.S. Cl. ........................... 340/429; 340/555; 340/566
[58] Field of Search ................. 340/428.5, 426, 340/429, 545.2, 545.3, 566, 555; 250/221

[56] References Cited

U.S. PATENT DOCUMENTS

| | | | |
|---|---|---|---|
| 3,585,584 | 6/1971 | Behrend | 340/430 |
| 3,614,734 | 10/1971 | Davis | 340/428 |
| 3,668,675 | 6/1972 | Joens et al. | 340/426 |
| 3,670,301 | 6/1972 | Douglas | 340/426 |
| 3,703,714 | 11/1972 | Andrews | 340/426 |
| 3,949,219 | 4/1976 | Crouse | 250/229 |
| 3,987,408 | 10/1976 | Sassover et al. | 307/10.5 |
| 4,143,368 | 3/1979 | Route et al. | 340/543 |
| 4,159,467 | 6/1979 | Ballin | 340/539 |
| 4,161,721 | 7/1979 | Conklin et al. | 340/543 |
| 4,258,353 | 3/1981 | Carlson | 340/467 |
| 4,383,242 | 5/1983 | Sassover et al. | 340/429 |
| 4,471,659 | 9/1984 | Udd et al. | 73/657 |
| 4,535,333 | 8/1985 | Twardowski | 340/539 |
| 4,584,569 | 4/1986 | Lopez et al. | 340/566 |
| 4,595,902 | 6/1986 | Proske et al. | 340/825.31 |
| 4,626,848 | 12/1986 | Ehlers | 340/825.69 |
| 4,631,527 | 12/1986 | De Witt et al. | 340/539 |
| 4,652,860 | 3/1987 | Weishaupt et al. | 340/539 |
| 4,683,753 | 8/1987 | Nelsen et al. | 340/429 |
| 4,701,751 | 10/1987 | Sackett | 340/556 |
| 4,719,460 | 1/1988 | Takeuchi et al. | 340/825.31 |
| 4,754,255 | 6/1988 | Sanders et al. | 340/426 |
| 4,794,368 | 12/1988 | Grossheim et al. | 340/426 |
| 4,837,567 | 6/1989 | Kleefeldt et al. | 340/825.31 |
| 4,862,139 | 8/1989 | Fukamachi et al. | 340/426 |
| 4,866,417 | 9/1989 | DeFino et al. | 340/429 |
| 4,868,915 | 9/1989 | Anderson, III et al. | 340/825.31 |
| 4,887,065 | 12/1989 | Robitschko et al. | 340/430 |
| 4,940,964 | 7/1990 | Dao | 340/438 |
| 4,942,393 | 7/1990 | Waraska et al. | 340/825.72 |
| 4,983,953 | 1/1991 | Page | 340/467 |
| 4,990,906 | 2/1991 | Kell et al. | 340/825.31 |
| 5,047,629 | 9/1991 | Geist | 250/231.1 |
| 5,049,867 | 9/1991 | Stouffer | 340/426 |
| 5,113,182 | 5/1992 | Suman et al. | 340/426 |
| 5,132,660 | 7/1992 | Chen et al. | 340/428 |
| 5,134,392 | 7/1992 | Takeuchi et al. | 340/825.69 |
| 5,146,215 | 9/1992 | Drori | 340/825.32 |
| 5,159,334 | 10/1992 | Baumert et al. | 340/825.72 |
| 5,160,850 | 11/1992 | Spirig et al. | 250/559.13 |
| 5,208,647 | 5/1993 | Longa et al. | 356/139.09 |
| 5,225,672 | 7/1993 | Jones | 250/227.21 |
| 5,313,295 | 5/1994 | Taniguchi et al. | 348/149 |
| 5,315,285 | 5/1994 | Nykerk | 340/426 |
| 5,469,141 | 11/1995 | Ghazarian | 340/566 |
| 5,499,196 | 3/1996 | Pacheco | 702/81 |
| 5,506,567 | 4/1996 | Bichlmmaier et al. | 340/545.3 |
| 5,682,133 | 10/1997 | Johnson et al. | 340/426 |
| 5,805,056 | 9/1998 | Mueller | 340/426 |
| 5,943,233 | 8/1999 | Ebina et al. | 250/221 |

*Primary Examiner*—Daniel J. Wu
*Assistant Examiner*—Van T. Trieu
*Attorney, Agent, or Firm*—Chupa & Alberti, P.C.

[57] ABSTRACT

An optical shock sensor 22 which includes a light generator 40 adapted to generate light 46 and a light detector 44 which are an optical communication by means of a moveable hemispheric dome 48. Specifically, an intrusion, tampering, motion, and/or shock, applied to vehicle 11, causes the moveable dome 48 to move, and to interrupt or change the amount tyoe, focus and/or intensity of the light 46 which is reflected or communicated to light detector 44, thereby causing a tampering output signal to be selectively produced.

6 Claims, 3 Drawing Sheets

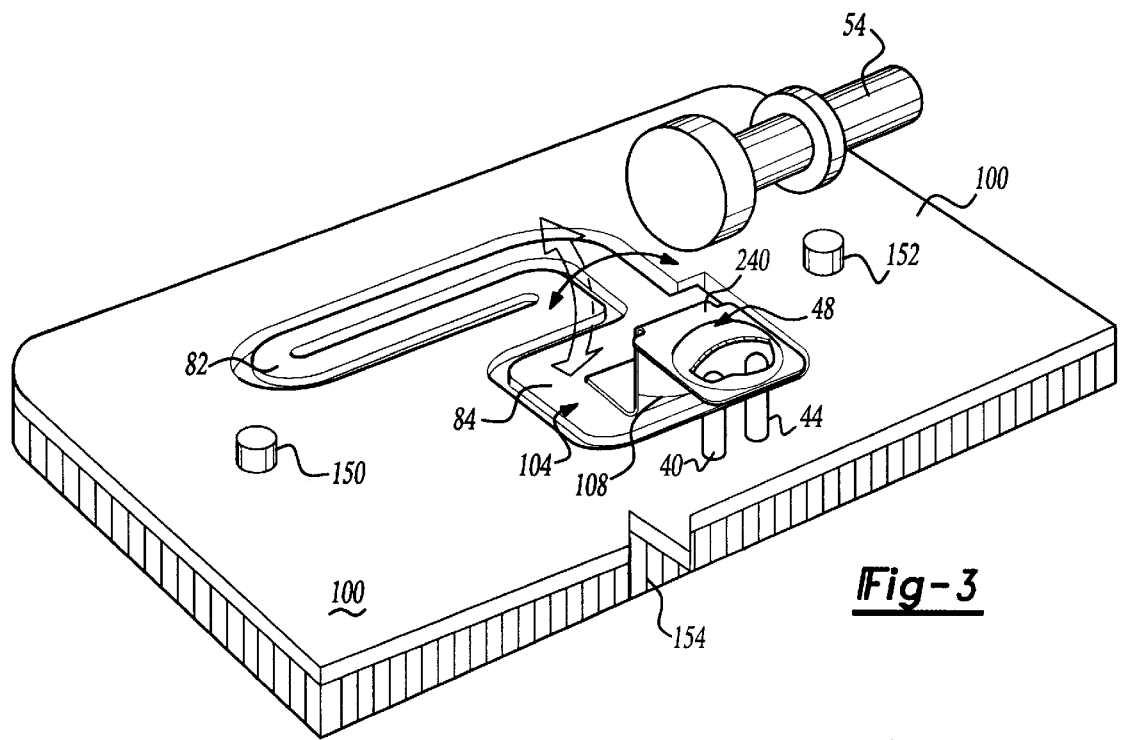
*Fig-3*
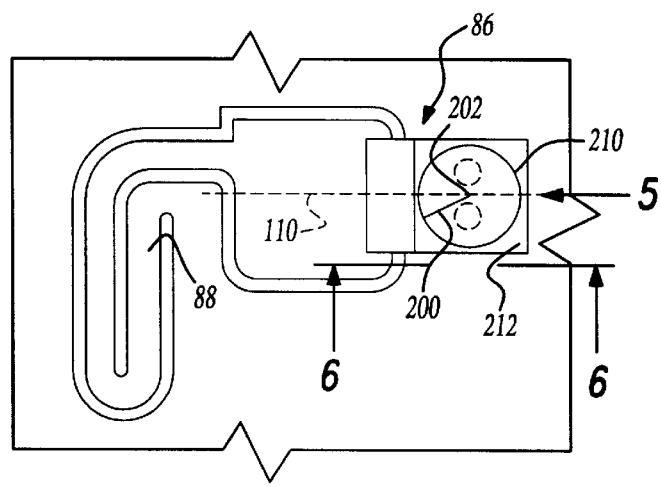
*Fig-4*
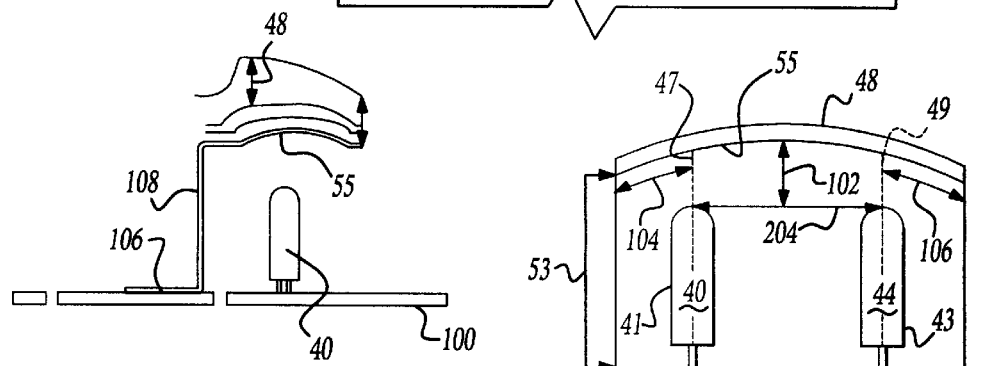
*Fig-5*
*Fig-6*

OPTICAL SHOCK SENSOR

FIELD OF THE INVENTION

This invention relates to an optical shock sensor and more particularly, to an optical shock sensor which is adapted for use in and/or as part of a vehicle security system and which is further adapted to selectively produce and/or output a signal when undesired tampering with the vehicle is detected, the output signal being effective, in one embodiment of the invention, to activate a siren or other type of audio and/or visual signaling device which may be effective to "warn away" a potential thief and/or to notify the vehicle owner of the attempted theft.

BACKGROUND OF THE INVENTION

Shock or tamper detection sensors are normally deployed within and/or as part of an overall security system which may be selectively deployed on/within a vehicle or on/within other objects which are desired to be protected. Particularly, these sensors are normally adapted to sense motion, shock and/or activity associated with and/or caused by undesired tampering, movement, theft, and/or attempted theft to the protected vehicle or object, and to produce an output signal indicative of this sensed and undesired activity. Many of these prior sensors included a movable magnet which was positioned in close proximity to an inductor or electrical "coil". As tampering type motion and/or "shock" was imparted to the sensor, the magnet was caused to move in relation to the relatively fixed electrical coil and an electrical signaling output current was produced which usually caused a siren, light, and/or other type of audio or visual signaling device to become activated, thereby providing a "positive" tampering signal which was often effective to "scare off" the potential thief and/or notify the owner of the protected object that a theft was attempted. Other types of prior sensors also include those which utilized a commercially available piezo type element to produce an electrical current output signal upon the detection of such tampering or induced and sensed shock or motion.

While these prior sensors provide tampering output signals, they suffered from some drawbacks. By way of example and without limitation, many of these prior sensors required a relatively large amount of electrical power in order to operate. This was and remains a particularly troublesome drawback since these prior sensors were and are normally employed as part of or an overall vehicle security system. As should be appreciated by those of ordinary skill in the art, vehicle security systems are normally and selectively "armed" or "activated" when the vehicle is parked (e.g. at an airport) for relatively long periods of time and are "powered" by the vehicle battery. Should the deployed sensor draw or require a relatively large amount of electrical power, the vehicle battery would ultimately and in relatively short order discharge leaving the vehicle owner stranded and resulting in an undesirable situation.

Further, many of these prior sensors, especially the piezo type, had variable temperature related sensitivities which caused their tamper detection characteristics to vary between the various seasons of the year (e.g. actually being relatively insensitive to tampering in very cold weather). Such performance inconsistencies were and are, of course, undesirable since the owner of a vehicle could never be sure exactly how the system would function and/or exactly how sensitive the sensor and the overall security system would be. The prior coil and magnet sensors are also known to be susceptible to electromagnetic interference which causes these sensors to malfunction, especially in areas having a relatively high amount of ambient electromagnetic energy.

Lastly, by way of example and without limitation, many of these prior sensors were and remain relatively costly, relatively easily prone to component failure, and relatively large and bulky.

There is therefore a need, and it is a principal object this invention to provide, a sensor which is adapted for use in and/or as part of a vehicle security system, which draws or requires a relatively low amount of electrical power, which is relatively low in cost, and which overcomes many of the drawbacks of prior sensors, including but not limited to those drawbacks and characteristics which have been previously delineated above.

SUMMARY OF THE INVENTION

According to a first aspect of the present invention a sensor for use in combination with a vehicle security system is provided and which overcomes many of the various deficiencies and drawbacks of prior sensors.

According to a second aspect of the present invention a sensor is provided which selectively provides a light generator and a light detector which are in optical communication and which cooperate to selectively provide a "warn away" and/or an "alarm" signal when an intrusion and/or unwanted or undesired tampering is detected to the vehicle or other protected objected upon which the sensor is deployed.

According to a third aspect of the present invention an optical shock sensor is provided which is adapted for use in combination with a vehicle security system. The optical shock sensor of this third aspect of the invention provides a movable hemispheric and reflective dome which selectively interrupts, modifies and/or "modulates" the light which is communicated and/or "directed" to a detector in a manner which causes the selective generation of an "alarm" or "tampering signal". According to this aspect of the present invention, the optical shock sensor may be used upon objects other than vehicles (e.g. boats, plane, and motorcycles) and provides a relatively reliable and relatively cost effective indicator of attempted theft to the object to be protected.

According to a fourth aspect of the present invention, an optical shock sensor is provided. The optical shock sensor, according to this fourth aspect of present invention, includes a light generator which is deployed upon a circuit board and which is adapted to generate or supply light; a light detector which is deployed upon the circuit board in close proximity to the light generator and which is in selective optical communication with the light generator; and a movable hemispheric dome which is an optical communication with the light generator and the light detector and which is further mounted over the light generator and the light detector and upon a serpentine spring integrally formed within the circuit board, the moveable hemispheric dome being adapted to receive the light generated by the light generator and to cause all and/or a portion of the received light to be selectively communicated to the light detector, thereby causing the production of a tampering output signal.

These and other features, objects, and advantages of the present invention will became apparent from a reading of the following detailed description of the preferred embodiment of the invention, by the reference to enclosed drawings, and by the reference to the various claims included in this application for patent.

BRIEF DESCRIPTION OF THE DRAWINGS

FIG. 3 is a perspective disassembled view of a portion of the optical shock sensor shown in FIGS. 1 and 2;

FIG. 4 is a top view of that portion of the optical shock sensor shown in FIG. 3;

FIG. 5 is a partial "cut-away" view of the optical shock sensor shown in FIG. 4, taken in the direction of arrow 5, and further illustrating motion or shock induced movement;

FIG. 6 is a partial "cut-away" view of the optical shock sensor shown in FIG. 4 taken along view line 6—6;

DETAILED DESCRIPTION OF THE PREFERRED EMBODIMENT OF THE INVENTION

Figure 1:
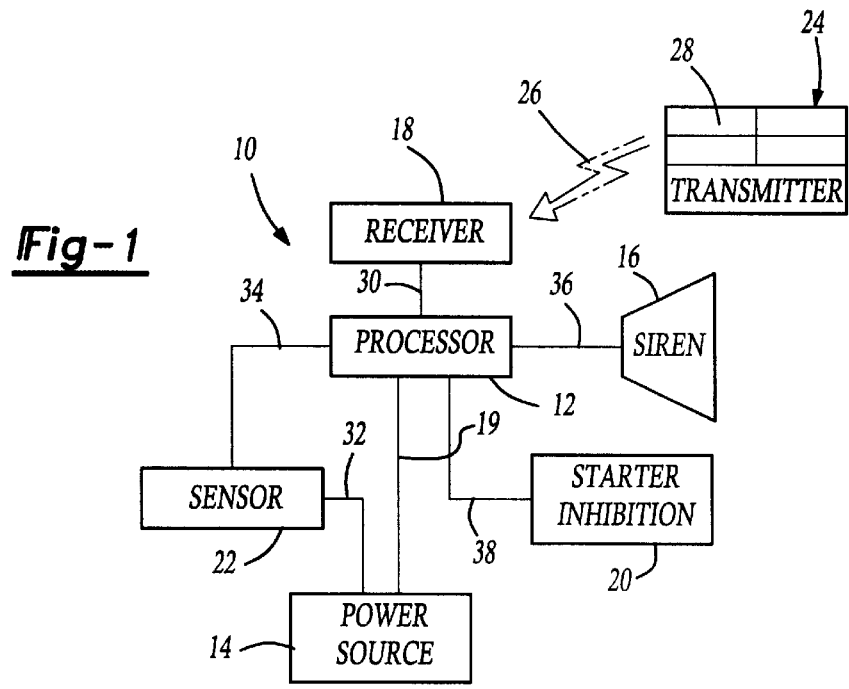
FIG. 1 is a block diagram of a vehicle security system utilizing an optical shock sensor made in accordance of teachings of the preferred embodiment of this invention.
Figure 7:
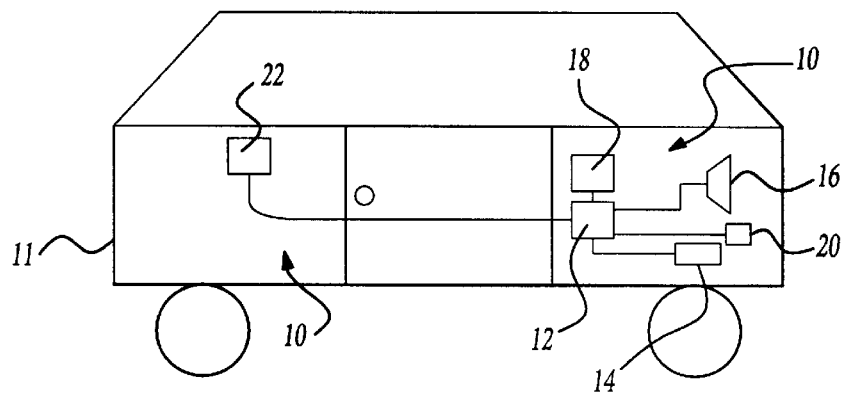
FIG. 7 is a block diagram illustrating the deployment of the optical shock sensor made in accordance with the teachings of the preferred embodiment of this invention upon a vehicle.

Referring now to FIGS. 1 and 7 there is shown a vehicle security system 10 made in accordance with the teachings of the preferred embodiment of the invention and particularly including an optical shock sensor 22 made in accordance with the teachings of the preferred embodiment of the invention. As shown, system 10 is adapted to be selectively deployed upon and/or within a conventional automobile 11 and/or upon and/or within some other object (e.g. boat, airplane, or motorcycle) which is desired to be protected and/or secured against theft. The operation of system 10 upon/within vehicle 11, which is described below, is substantially identical to the operation of the system when the system is deployed upon another object. Accordingly, the following system description is equally and substantially similar to the operation of system 10 upon one of these other objects which are desired to be protected.

As shown, system 10 includes a "main control unit" or processor 12, operating under stored program control, firmware control, and/or hardwired logic control, and which is physically and electrically coupled or connected to a source of electrical power 14, such as a vehicle battery, by means or by use of bus 19. In a first embodiment of the invention, processor 12 comprises a commercially available microprocessor and is further connected to a conventional, commercially available, selectively activated, and typical siren 16; to a radio receiver 18 by means of bus 30; to a starter inhibition device 20 by means of bus 38; and to an optical shock sensor 22 made in accordance with the teachings of the preferred embodiment of the invention. In one embodiment of the present invention, security system 10 may correspond to those vehicle security systems described and/or claimed within U.S. Pat. No. 4,740,775 ("the '775 patent") issued on Apr. 26, 1988 and U.S. Pat. No. 5,049,867("the '867 patent"), issued on Sep. 17, 1991 which are each fully and completely incorporated herein by reference, word for word and paragraph for paragraph and which are each owned by the Assignee of this application. Particularly, sensor 22 may replace the shock sensor 280 shown and described within FIG. 10 of the '867 patent. All other aspects of the vehicle security system 10, in one embodiment, may be substantially similar to the vehicle security system described within the '867 patent.

Processor 12 is further communicatively coupled to a radio frequency hand held type transmitter 24, which is normally operated by a user of system 10. Particularly, a user of system 10 selectively generates a radio frequency type signal 26, having certain command and control information, which is received by receiver 18, demodulated, and communicated to processor 12 by means or by use of bus 30.

Specifically, in one embodiment, a user of the vehicle security system 10 operates or controls the operation of system 10 by depressing one or more of the switches or "buttons" 28 on the transmitter 24, effective to selectively generate the radio frequency signal 26 which contains the information identifying and/or containing the commands associated with the depressed switches or "buttons" 28. This control and command signal information, once received by processor 12, is utilized by the stored software and/or firmware program or hardwired type logic contained within the processor 12 and causes the stored software or firmware program and/or logic to have the processor 12 assembly perform certain functions. In this manner, vehicle security system 10 may be selectively "armed", "disarmed", or placed into a number of known and conventional operational vehicle security modes, many of which are explained in the previously incorporated '867 patent.

Further, it should be apparent to one of the ordinary skill in this vehicle security art, that starter inhibition device 20 may comprise one of a number of known and conventional devices such as a starter inhibition relay assembly which is adapted to selectively interrupt the flow of electricity from the vehicle's ignition switch to the vehicle's starter motor when system 10 is in the "armed mode", a relay which is designed to selectively and electrically ground the vehicle's ignition coil when system 10 is in the "armed" state, and/or one or more relays which are designed to interrupt the flow of fuel to the vehicle's fuel pump when the system 10 is in the "armed state". In this manner, when the vehicle security system 10 is selectively "armed" by the depression of one or more of the switch or "buttons 28", starter inhibition device 20 may be selectively engaged or activated by processor 12 in a manner which is designed or adapted to substantially prevent the vehicle from starting and/or operating by a simple turning of the ignition switch. Such starter inhibition devices are shown, by way of example and without limitation, within the '867 and '775 patents.

Moreover, in the selective "armed mode", sensor 22, which is powered by power source 14 (e.g. a vehicle battery) by means or by use of bus 32, is designed and adapted to provide a shock, motion, and/or tamper detection output signal on alarm bus or wire 34 to processor 12 in a manner which allows processor 12 to be notified of potential intrusion, motion, shock, and/or undesired and unwanted tampering with and/or of the vehicle 11. Upon receipt of the tamper detection output signal emanating from the sensor 22, processor 12, acting under stored program, firmware, and/or hardwired logic type control provides or allows a "sourcing" of electrical power from the power source 14 to siren 16 along buses 19 and 36, thereby allowing the siren 16, or some other audible or visual means, or device(s)

which may replace siren 16, to provide a "positive" indication of the potential intrusion into the vehicle. This "positive" indication may be sufficient to "scare away" a potential thief and/or notify the vehicle owner that an attempted theft has occurred. A discussion of the operation of the optical shock sensor 22 will now ensue.

Figure 2:
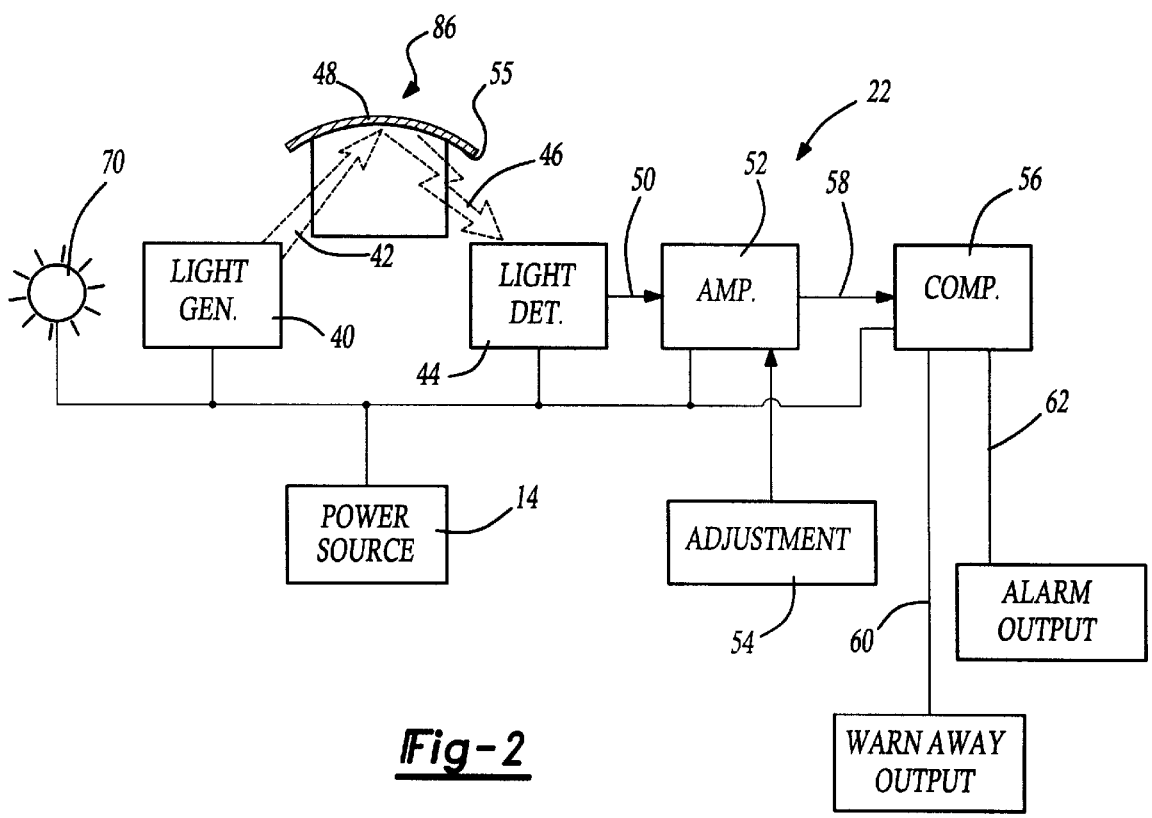
FIG. 2 is a block diagram of the optical shock sensor made in accordance with the teachings of the preferred embodiment of this invention and shown, for example and without limitation, in FIG. 1.

Referring now to FIG. 2 there is shown a block diagram of the optical shock sensor 22 made in accordance with the teachings of the preferred embodiment of the invention. As shown, optical shock sensor 22 includes a light generator 40 which is adapted to generate at least one light signal 42 (e.g. comprised of a plurality of light rays) and a light detector 44 which is adapted to selectively receive a light signal 46 which is generated or created by at least a partial reflection of light signal 42 off of the reflective undersurface 55 of dome 48.

It should be noted at the outset that in the preferred embodiment of the invention, dome 48 is a hemispherical dome (e.g. defined by *The American Heritage Dictionary of the English Language*, produced by the Houghton Mifflin Company as "[a] half of a symmetric, approximately spherical object as divided by a plane of symmetry"). Applicant has found that other shapes, associated with dome 48, are desirable and useful and this application is not limited to this exact dome shape, but rather encompasses the use of any moveable object which is adapted to selectively reflect the light communicated to it from source 40 to receiver 44. Both the light generator 40 and the light detector 44, in this embodiment, are mounted or positioned in a relatively close mutually proximate relationship upon a flexible circuit board 100. Particularly, in this embodiment, light generator 40 comprises a commercially available infrared light emitting diode which is available from the Motorola Corporation of Shaumburg, Ill. In this embodiment, receiver 44 comprises a commercially available NPN type photo transistor such as that produced by the Motorola Corporation of Shaumburg, Ill. As shown, both generator 40 and detector 44 have generally and substantially similar elongated portions, respectively denoted as 41 and 43. Particularly, in this embodiment, the longitudinal axis 47 of portion 41 is substantially parallel to the longitudinal axis 49 of portion 43. Axis 47 is separated from axis 49 by a distance, corresponding to the length of axis 204 joining the respective axes 47 and 49, of about two to about three millimeters. Moreover, the distance 53 corresponding to the distance from circuit board 100 to the end of member 40 closest to dome surface 55 is the same as the corresponding distance associated with member 44 and, in one embodiment, is equal about three centimeters. Further, in this embodiment, the radius 200 of dome 48 is about one to about two centimeters and the center point 202 of dome 48 is positioned at the center of axis 204.

Specifically, in the preferred embodiment of the invention, the light signal 42 which is generated by the light generator 40 is communicated to or is made to impinge upon and/or within the reflective underside 55 of a movable hemispheric dome 48 and to thereafter be reflected, interrupted, and/or modulated, at least in part, before it or a portion of the received light is communicated to light detector 44. In the preferred embodiment of the invention, the dome 48 (e.g. reflective underside 55 made of, for example and without limitation, tin, aluminum, or commercially available metallic material) overlays both generator 40 and receiver 44 by a clearance distance 102 (e.g. the distance between axis 204 and midpoint 202) of about one centimeter. Moreover, distances 104 and 106, respectively corresponding to the distance between the longitudinal axis of symmetry 47 of generator 40 and a first end of dome 48 and to the distance between the longitudinal axis of symmetry 49 of receiver 44 and the opposite end of dome 48, are substantially equal and are about one centimeter in length. Further, in the preferred embodiment of the invention, the pitch, from midpoint 202 along any direction, to the circle 210 formed by the intersection of plane 212 with dome 48 is about one degree (1°) per millimeter, although other values may be acceptable.

In operation, the signal 46 received by detector 44 is coupled, by means or by use of the bus 50, to a typical and conventional amplifier 52 where it is amplified according to and in a manner consistent with an adjustment made to the conventional and commercially available potentiometer 54, such as that provided by the Motorola Corporation. The amplified signal is coupled to a typical and conventional comparator 56 such as that provided by the Motorola Corporation, along bus 58, where the amplitude and duration of the signal along bus 58 is compared with at least one known and predetermined value. Depending upon this comparison, in the preferred embodiment of the invention, one of two output signals is generated. That is, if the amplified signal along bus 58 is above a first threshold level and below a second threshold level, then a relatively short "warn way" output signal 60 is provided which may comprise a relatively short sounding-activation of siren 16. However, if the amplitude of the signal 52, along bus 58, is below both the first and second threshold levels, then an alarm output signal 62 is generated. Particularly, this alarm output signal is generated along bus 34 of processor 12 and causes processor 12 to couple the electrical power source 14 to siren 16 thereby providing a siren output signal for a relatively long period of time and at a relatively high level. The creation of each of the output signals 60, 62 are dependant upon the movement of the dome 48, such movement being caused by a sensing of undesired tampering to the vehicle or protected object. In the preferred embodiment of the invention, almost all of the light signal 42 is reflected off of undersurface 55 of dome 48 when dome 48 is not moving (e.g. no tampering is occurring). When tampering occurs, dome 48 is moved (see FIG. 5) and such movement interrupts, changes, and/or modulates light signal 42 and causes a modulated light signal 46 to be communicated to detector 44, thereby causing signal 46 to be below these threshold values. The greater the movement of dome 48, the more modulation occurs.

The operation of shock sensor 22 will now be explained in further detail with reference to FIGS. 3, 4, 5, 6, 8, 9, an 10. Specifically, as best shown in FIG. 3, shock sensor 22 includes a substantially planar or substantially flat circuit board 100 having an integrally formed serpentine spring portion 82 with a first generally rectangular stage portion 84 upon which the dome assembly 86 is moveable disposed. Particularly, in this embodiment, dome assembly 86 includes as integrally formed attachment portion 104 having a first generally flat portion 106 attached to and overlaying portion 84 (e. g. the attachment may be made by solder and/or by a commercially available pin or other securing means); a vertical portion 108, disposed at a substantially right angle to portion 106; and a second horizontal and generally flat surface 240, which contains the dome 48. Assembly 86 allows dome 48, especially undersurface 55, to overlay generator 40 and receiver 44 in the manner previously described, The opposed end 88 of the spring 82 is formed with the circuit board 100 at a position along the longitudinal axis of symmetry 110 of assembly 46 and allows spring 82 to move parallel to the plane containing and/or formed by the circuit board 100; to move perpendicularly with respect to the plane contained or formed by the circuit board 100; and/or to move both parallel to and perpendicularly to the plane formed or contained by the circuit board 100 in a simultaneous or a substantially simultaneous manner.

Figure 8:
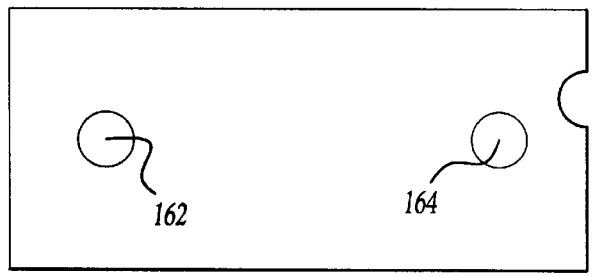
FIG. 8 is a view of a portion of the case which is adapted to enclose the optical shock sensor made in accordance with the teachings of the preferred embodiment of the invention and taken in the direction of arrow "8"
Figure 9:
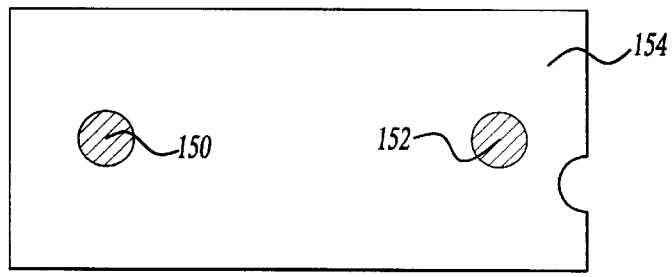
FIG. 9 is a view of a portion of a portion of the case which is adapted to enclose the optical shock sensor made in accordance with the teachings of the preferred embodiment of the invention and taken in the direction of arrow "9"
Figure 10:
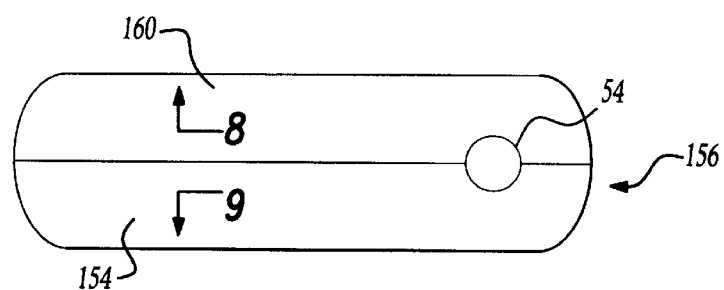
FIG. 10 is a side view of a case used to house the optical shock sensor made in accordance with the teachings of the preferred embodiment of the invention.

Further, as is best shown in FIGS. 8, 9, and 10, circuit board 100 is adapted to be removable fixed upon substantially similar generally rounded or elongated shafts or members 150, 152 which outwardly protrude from and are integrally formed within the bottom portion 154 of case 156. Top portion 160 has opposed and substantially similar mating reception portions 162, 164 which respectively and selectively receive posts 150 and 152 and which may be selectively attached to lower case portion 154 thereby cooperatively encapsulating circuit board 100. Potentiometer 54 is adapted to protrude away from case 156 in order to allow a user to selectively provide sensitivity setting from sensor 22.

As best shown in FIG. 5, movement, emanating from or caused by, undesired tampering is "sensed" or impinges upon case 156. This case motion causes a movement of circuit board 100. Such circuit board movement causes spring 82 to cause dome 48 to move. The movement of the dome, specifically movement of the reflective bottom portion 55, causes or changes the amount and/or focus and/or intensity of the light 46 which is communicated to detector 44 by the light generator 40. It is this movement induced change in the amount, type, and/or intensity/focus of the reflective light 46 which is communicated to light detector 44 which causes the output signal to be generated along bus 50 to amplifier 52. In this manner, the optical shock sensor 22 reliably senses unwanted movement, tampering, and/or shock which is impinge or part to a vehicle and provides a reliable, costs defective, and temperature insensitive method and device for producing such a tampering detection signal. It should be appreciated that what has been shown in a new optical shock sensor comprised of relatively inexpensive components, relatively reliable, and, due to its optical nature, very unsusceptible to electromagnetic interference.

It is to be understood that the invention is not limited to the exact construction and modification illustrated and described both, but many changes and modification may be made without the parting from the spirit in the scope of the invention is to find in the following claims.

We claim:

1. An optical shock sensor for use in vehicle and adapted to detect tampering with said vehicle, said optical shock sensor comprising:

a light generator which is adapted to generate light, a light detector; and a moveable dome, optically disposed between said light generator and said light detector, adapted to receive said generated light and to allow certain portion of said generated light to be received by said light detector when said tampering with said vehicle occurs, thereby causing said light detector to emit a tampering output signal.

2. The optical shock sensor of claim 1 wherein said moveable dome is positioned above said light detector and said light emitter.

3. The optical shock sensor of claim 1 further comprising an amplifier connected to said light detector and adapted to receive said tampering output signal, to selectively amplify said tampering output signal, and to provide an amplified output signal.

4. A tamper detection sensor for use in vehicle and adapted to detect tampering with said vehicle, said tamper detection sensor comprising:

a light generator mounted upon a circuit board and adapted to generate light;

a light detector mounted upon said circuit board and in optical communication with said light generator and said light detector adapted to generate a tamper detection signal upon receipt of a certain portion of said light generator light;

a dome positioned over said light generator and said light detector and upon a movable serpentine spring, integrally formed within said circuit board, said serpentine spring being adapted to move said dome in response to vehicle tampering, thereby causing said detector to receive certain portion of said generated light and to produce said tamper detection signal.

5. The tamper detection sensor of claim 4 said dome is a parabolic dome.

6. A shock sensor comprising:

a moveable dome adapted to reflect light; and to move in response to a shock;

a light generator adapted to generate light and to direct at least a portion of said generated light to said dome;

a light detector adapted to receive at least a portion of said reflected light from said dome, thereby sensing said movement of said dome and producing an output signal in response to said sensed movement of said dome.

* * * * *